Aug. 8, 1950 W. C. RENNE 2,518,182
WATER MIXING VALVE
Filed Dec. 14, 1946 2 Sheets-Sheet 1

INVENTOR,
William C. Renne.
BY Roy E. Hamilton,
Attorney.

Aug. 8, 1950  W. C. RENNE  2,518,182
WATER MIXING VALVE
Filed Dec. 14, 1946  2 Sheets-Sheet 2

INVENTOR,
William C. Renne.
BY
Roy E. Hamilton,
Attorney.

Patented Aug. 8, 1950

2,518,182

UNITED STATES PATENT OFFICE 2,518,182

WATER MIXING VALVE

William C. Renne, Kansas City, Mo.

Application December 14, 1946, Serial No. 716,264

4 Claims. (Cl. 236—12)

This invention relates to new and useful improvements in a water mixing valve, and has particular reference to a water mixing valve thermostatically controlled to deliver water at a predetermined constant temperature.

The principal object of the present invention is the provision of a mixing valve wherein a jet of water is thermostatically operable to direct said jet into one or the other of two expandible bellows, the expansion and contraction of said bellows being utilized to control the relative openings of the hot and cold water inlets to said mixing valve.

Another object is the provision of a means whereby said mixing valve may be adjusted to deliver water at any temperature between the temperature of the cold water supply and the temperature of the hot water supply.

A further object of the provision of a manually operable means for shutting off both the hot and cold water supplies.

A still further object is the provision of a means whereby the water supply to the mixing valve is shut off automatically if either the hot or the cold water supply fails completely.

Other objects are simplicity and economy of construction, dependability and accuracy of operation, and adaptability to function efficiently in spite of substantial variations of pressure and temperature of the hot and cold water supplies.

With these objects in view, as well as other objects which will become apparent during the course of the specification, reference will be had to the drawings, wherein:

Fig. 3 is a horizontal section taken on line III—III of Figure 2.

Figure 1:
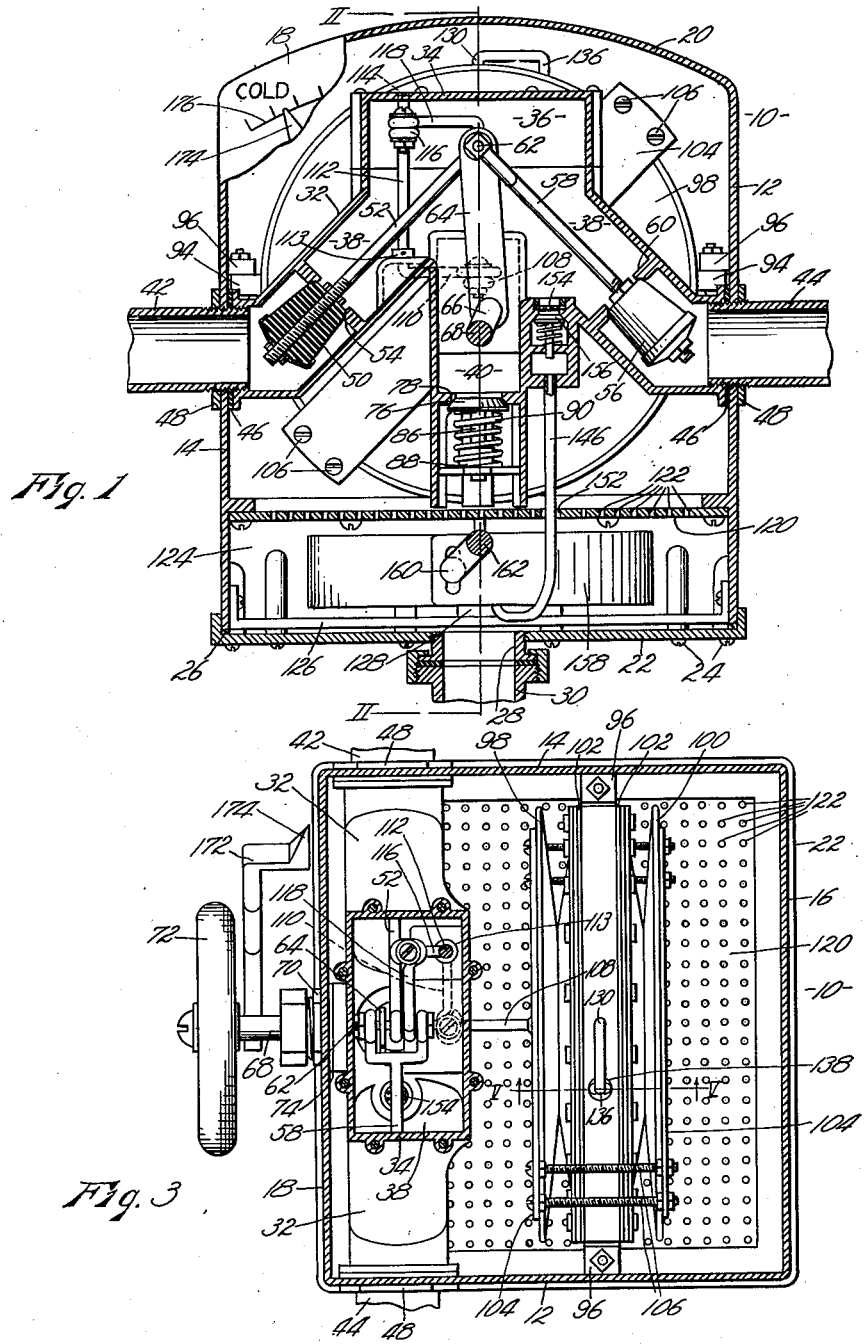
Figure 1 is a front elevation of a water mixing valve embodying the present invention, partially broken away to show operating parts.

Like reference numerals apply to similar parts throughout the several views, and the numeral 10 refers to a housing member having a right side wall 12, left side wall 14, back wall 16, front wall 18, and top wall 20. The lower side of said housing is closed by means of a cover 22 rigidly attached to housing 10 by means of screws 24. A watertight seal between said cover and said housing is maintained by gasket 26. Communicating with the interior of housing 10 is a pipe 28 rigidly fixed in cover 22, through which water is delivered from said housing to a swinging spout 30 or any other fixture desired.

Carried in the upper forward portion of housing 10 is a valve body 32 having a cap 34 removably secured thereto. Said valve body encloses essentially a mixing chamber 36, two downwardly divergent tubular passageways 38 communicating at their upper ends with said mixing chamber, and a vertically downwardly extending tubular passageway 40 communicating at its upper end with said mixing chamber at a point between said downwardly divergent passageways. Said divergent and vertical passageways lie in the same vertical plane.

A pipe 42, extending into housing 10 through side wall 14 and threaded at its inner end into valve body 32, supplies hot water from a suitable source to the left passageway 38. A pipe 44, extending into housing 10 through side wall 12 and threaded at its inner end into valve body 32, supplies cold water from a suitable source to the right passageway 38. A flat gasket 46 around each of pipes 42 and 44, and clamped between valve body 32 and housing 10 by means of lock nuts 48 threaded on said pipes outside of said housing, as shown in Figure 1, maintain watertight seals between said valve body and said housing, and prevent leakage of water from said housing around said pipes.

A valve 50, carried by valve stem 52 in left passageway 38, is operable in conjunction with valve seat 54 formed integrally with valve body 32, to regulate the flow of hot water in said passageway. A valve 56, carried by valve stem 58 in right passageway 38, is operable in conjunction with valve seat 60 formed integrally with valve body 32, to regulate the flow of cold water in said passageway. Valve stems 52 and 58 extend upwardly respectively through valve seats 54 and 60 and converge upwardly into mixing chamber 36. At their upper ends, said valve stems are pivotally connected to a floating shaft 62, which extends horizontally at right angles to said valve stems. A link 64, pivotally connected at its upper end with said floating shaft, is pivotally connected at its lower end with crank arm 66 of shaft 68. Said shaft extends forwardly through bearing member 70 to a point outside of front wall 18 of housing 10, and a manually operable handle 72 is rigidly fixed to its outer end. Said bearing member is threaded into valve body 32 and extends forwardly through wall 18. A watertight seal around said bearing member is provided by a gasket 74 clamped between said valve body and said front wall. Contained in said bearing member about shaft 68 is a packing ring 80, which is compressed by packing gland 82 and packing nut 84 to prevent leakage of water between said shaft and said bearing member.

Included in vertical passageway 40 of valve body 32 below shaft 68 is a check valve disc 76, which in conjunction with valve seat 78 formed integrally with valve body 32 acts to allow the flow of water through passageway 40 in the downward direction only. The stem 86 of said valve disc extends downwardly therefrom and is slidably carried at its lower end in bearing 88 formed integrally with valve body 32. Valve disc 76 is urged upwardly toward the closed position by helical spring 90. The open lower end of passageway 40 below check valve 76 is slotted to provide easy flow of water from said passageway into housing 10.

Carried in housing 10 behind valve body 32 is a vertically disposed circular disc 92, said disc having lugs 94 formed at its opposite edges, said lugs in turn being firmly fastened to lugs 96 formed integrally with side walls 12 and 14 of housing 10.

An expandible bellows 98 is firmly attached to the forward side of disc 92, and a similar bellows 100 is attached to the rearward side of said disc. Said disc forms a common wall between said bellows, and a watertight seal is maintained between the disc and each bellows by gaskets 102. Rigidly attached to the movable face of each of said bellows, and extending outwardly past the edges of said faces, are flat bars 104. The extended ends of said bars are rigidly connected by bolts 106, as shown in Figures 1 and 3. Said bars and connecting bolts cause said bellows to expand and contract simultaneously. When either bellows is expanded, the other must contract an equal amount.

Rigidly attached to bar 104 attached to bellows 98 at substantially the mid-point thereof is a forwardly extending horizontal rod 108, pivotally connected at its forward end with horizontal crank arm 110 of vertical shaft 112. Said shaft is oscillatably carried by valve body 32, extending upwardly into said valve body and having its upper end pivotally carried in a recess 114 provided therefor in cap 34 of said valve body. Longitudinal movement of said shaft is prevented by stop collar 113. A crank arm 116 is rigidly fixed to shaft 112 within said valve body, and extends horizontally forward therefrom. At its forward end said crank is pivotally connected to one end of a link 118 extending horizontally at right angles to said crank, the opposite end of said link being pivotally connected to floating shaft 62.

Figure 5:
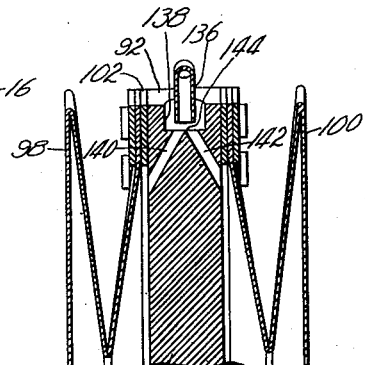
Fig. 5 is an enlarged fragmentary vertical section taken on line V—V of Figure 3.

Immediately beneath bellows 98 and 100 a plate 120 having a plurality of perforations 122 formed therethrough, extends horizontally across housing 10, forming a chamber 124 in the lower portion of said housing between said perforated plate and housing cover 22. Within said chamber, a horizontal support member 126 firmly attached to side walls 12 and 14 of housing 10, supports at its mid-point a bearing 128, the lower end of a small tube 130 is supported for oscillation in said bearing. Said tube extends vertically upward through hole 132 in perforated plate 120 and through hole 134 passing through the center of disc 92 parallel to the plane of said disc. The upper end of said tube extending past said disc is bent to form a downwardly projecting nozzle 136 in spaced apart relationship with the body portion of said tube. Said nozzle extends downwardly into a recess 138 in the edge of disc 92, as shown in Figure 5. Downwardly divergent holes 140 and 142 in disc 92 interconnect recess 138 with the interiors of bellows 98 and 100 respectively. Said holes are so disposed that the disc forms a knife edge 144 between the upper ends of said holes. Longitudinal movement of tube 130 through disc 92 is prevented by stop collar 148.

Figure 2:
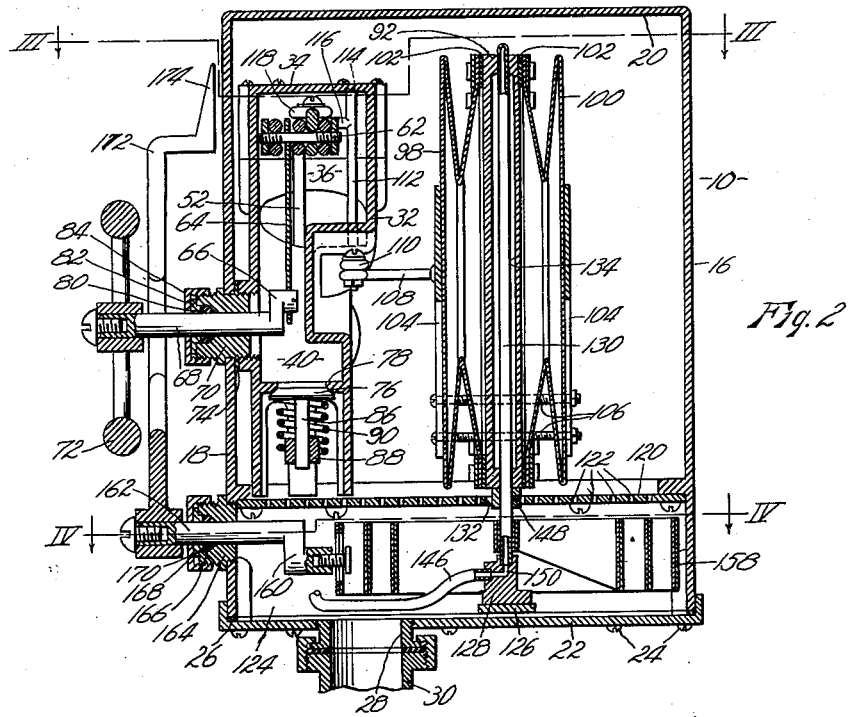
Fig. 2 is a vertical section taken on line II—II of Figure 1.

A tube 146 is fixed in bearing 128 and communicates with tube 130 by means of a passageway 150, as shown in Figure 2. Tube 146 extends along cover 22 of housing 10 to a point adjacent front wall 18 of said housing, and thence extends upwardly through hole 152 in perforated plate 120 and is interconnected at its upper end with mixing chamber 36 of valve body 32. Water flowing from said mixing chamber into said tube passes through strainer screen 154 and spring loaded check valve 156 carried by valve body 32. Said check valve permits the flow of water from mixing chamber 36 into tube 146, but prevents flow in the reverse direction.

Figure 4:
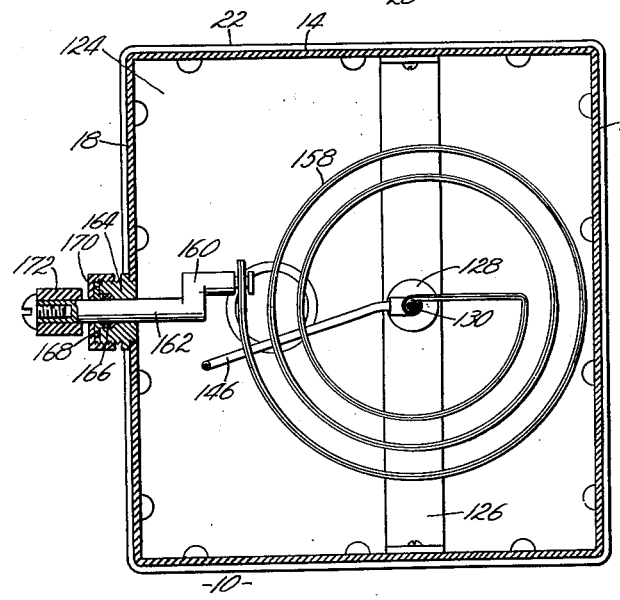
Fig. 4 is a horizontal section taken on line IV—IV of Figure 2.

A spiral bimetallic element 158 is disposed horizontally in chamber 124, the inner end of said element being connected rigidly to tube 130 between bearing 128 and perforated plate 120, as shown in Figures 2 and 4, and the outer end thereof being pivotally connected to crank arm 160 of shaft 162. Said shaft is carried for oscillation in bearing member 164 rigidly fixed in front wall 18 of housing 10, and extends forwardly therethrough to a point outside of said housing. A packing ring 166 contained in said bearing member around said shaft and compressed therein by packing gland 168 and packing nut 170 carried by said bearing member, prevents the leakage of water between said shaft and said bearing member. A setting handle 172 is rigidly connected to the forwardly projecting end of shaft 162. Said handle projects upwardly along front wall 18 of housing 10, terminating in an indicator point 174 which may be manually moved to any point on a temperature scale 176 carried by front wall 18 of housing 10, as shown in Figure 1.

Operation of the mixing valve is substantially as follows. Handle 172 is manually set to the mark on scale 174 which indicates the temperature desired. Shaft 162 is thus rotated, and through crank arm 160 causes bimetallic element 158 to turn. Said bimetallic element in turn rotates tube 130 in bearing 128 and causes nozzle 136 at the upper end of said tube to be positioned over either hole 140 or 142 of disc 92. If the temperature of the water desired is higher than that of the bimetallic element, the nozzle will be positioned over hole 140. If water of a lower temperature than that of the bimetallic element is desired, the nozzle will be positioned over hole 142.

Handle 72 is manually turned through one-half of a revolution. Shaft 68, thus rotated, turns crank arm 66 to its lower position, and floating shaft 62, connected to said crank arm by link 64, will be pulled downwardly. Valves 50 and 56, connected to said floating shaft by means of valve stems 52 and 58, will thus be forced downwardly from their seats, and hot and cold water will flow through passageways 38 into mixing chamber 36, downwardly through passageway 40, through check valve 76, into housing 10, downwardly through perforated plate 120 into chamber 124 where it surrounds bimetallic element 158, and is discharged from said chamber through pipe 28. Water flowing into chamber 124 is evenly distributed over the bimetallic element by perforated plate 120.

At the same time water flows from mixing chamber 36 through screen 154, check valve 156, tube 146, bearing 128, tube 130, and is discharged from nozzle 136. If the water flowing over the bimetallic element is at a lower temperature than that for which setting handle 172 is set, the bimetallic element will expand, turning tube 130 in a clockwise direction and positioning nozzle 136 over hole 140 in disc 92. The jet from nozzle 136 will thus exert a slight pressure on the water contained in bellows 98. Bellows 98 and 100 are filled with water at all times. The force exerted by said jet will be greatly amplified due to the great difference between the area of the jet and the area of the bellows. Said bellows will thus be expanded; said expansion, through rod 108, crank 110, shaft 112, crank 116, and link 118, will cause floating shaft 62 to be moved to the left. Valve 50 will thereby be opened more widely and valve 56 will be simultaneously closed by an equal amount, thereby supplying more hot water and less cold water to the mixing chamber. As the hotter mixture reaches chamber 124 and surrounds the bimetallic element, said element will be caused to contract, turning tube 130 in a counter-clockwise direction, thus moving nozzle 136 toward hole 142. When the water passing over the bimetallic element has reached the desired temperature, the nozzle will be centered over knife edge 144 between holes 140 and 142, and since equal pressure will then be exerted on the water contained in both bellows, no movement will occur and the settings of valves 150 and 156 will be fixed.

When the temperature of the water passing over the bimetallic element rises above the temperature for which handle 172 is set, the action is reversed, the bimetallic element turning tube 130 in a counterclockwise direction to position nozzle 136 above hole 142, thus exerting pressure on the water contained in bellows 100, the expansion of said bellows acting through the above described linkage to move floating shaft 62 to the right, thus opening cold water valve 56 and closing hot water valve 50.

Since the movable ends of bellows 98 and 100 are rigidly connected by bars 104 and bolts 106, when one bellows is expanded the other must contract. The water expelled from the contracted bellows through hole 140 or hole 142 is discharged into housing 10. When the contracted bellows is next expanded, the water necessary to fill it is supplied by the jet from nozzle 136.

Whenever the pressure in either hot or the cold water supply pipes fails completely, the valve in the other supply pipe will be closed completely, thus protecting the user of the valve against extremes of temperature. For instance, if the pressure in hot water supply pipe 42 fails completely, shaft 62 will be moved farther and farther to the left by the action described above until valve 50 is wide open and valve 56 is completely closed. The same action will occur whenever the temperature of the hot water supply falls below that for which handle 172 is set, or when the temperature of the cold water supply exceeds said set temperature. Since nozzle 136 is retained in recess 138 of disc 92, it is prevented from over-traveling holes 140 and 142.

Due to the restriction to flow offered by perforated plate 120 and by the fixture to which the mixing valve may be attached, housing 10 will partially fill with water, trapping a pocket of air under slight pressure in the upper portion of housing 10. This pressure might interfere with the free flow of the jet from nozzle 136. For this reason, spring 90 urging check valve disc 76 toward the closed position must be of a strength to insure at all times a sufficient pressure differential between valve body 32 and housing 10 to cause the jet to flow freely.

Check valve 76 and check valve 156 also serve as safety devices, preventing the possible suction of contaminated water into the supply lines in case a vacuum should form in said supply lines.

I claim:

1. A mixing valve comprising a housing containing three interconnected chambers, the first of said chambers having an inlet for hot water and an inlet for cold water, a valve controlling each of said inlets, means interconnecting said inlet valves whereby as one valve is open the other valve is closed, a mixing chamber for said hot and cold water, and means for diverting a portion of the water from said mixing chamber to form a jet within the second of said chambers, said second chamber containing a pair of expansible bellows, means interconnecting said bellows whereby when one bellows is expanded the other bellows is contracted, a thermostatic element carried in the third of said chambers, means operable by said thermostatic element for directing said jet selectively into said expansible bellows, and means operably connecting said bellows to said valves, whereby said valves are moved to supply a flow of water at a substantially uniform temperature.

2. A mixing valve comprising a housing, a valve body contained in said housing, said valve body having an inlet for cold water and an inlet for hot water, a valve member controlling each of said inlets, seats for said valve members, said valve members being connected so as to move simultaneously, manual means for causing said valve members to open or close simultaneously, means for causing said valve members to move in opposite directions whereby one of said inlets is opened and the other of said inlets is closed, and means for diverting a portion of the water from said valve body to form a jet within said housing, two expansible bellows contained in said housing, said bellows each having an opening into said housing, said openings being adjacent each other and having a knife edged partition therebetween, a thermostatic element contained within said housing whereby said jet is directed in variable proportions into said bellows through said openings, and means operably connecting said bellows to said valve members whereby said valve members are moved in opposite directions to control said hot and cold water inlets.

3. A mixing valve comprising a housing, a valve body contained within said housing, said valve body having an inlet for hot water and an inlet for cold water, a valve controlling each of said inlets, a mixing chamber for said hot and cold water having an outlet into said housing, a spring loaded check valve controlling said outlet whereby a pressure differential is maintained between said mixing chamber and said housing, a nozzle carried in said housing, means for diverting a portion of the water from said valve body through said nozzle in a jet, two expansible bellows carried in said housing, a bimetallic thermostat carried in said housing and over which said mixture of hot and cold water flows, means operable by said bimetallic thermostat whereby said jet is selectively directed into said bellows thereby expanding said bellows, means operably connecting said bellows with said inlet valves whereby one of said valves is opened and the other of said valves is moved toward the closed position, and manual means for adjusting said bimetallic thermostat whereby the relative openings of said valves are regulated to provide a water mixture at any predetermined temperature.

4. In a water mixing valve of the class described having a valve body carried in a housing and opening into said housing, the combination with two valve members controlling respectively hot and cold water inlets to said valve body, seats for said valve members, and stems for said valve members, said stems being convergent and pivotally connected at their point of convergence to a floating shaft, of a manually operable means for moving said floating shaft in a direction bisecting the angle between said stems whereby said valve members are simultaneously moved toward or away from said valve seats, and a thermostatically operable means for moving said floating shaft in a direction transverse to said first named direction whereby one of said valve members will be moved toward its seat and the other of said valve members will be moved away from its seat.

WILLIAM C. RENNE.

REFERENCES CITED

The following references are of record in the file of this patent:

UNITED STATES PATENTS

| Number | Name | Date |
| --- | --- | --- |
| 1,476,718 | Leonard | Dec. 11, 1923 |
| 1,869,663 | Cartier | Aug. 2, 1932 |
| 2,193,581 | Clokey | Mar. 12, 1940 |
| 2,214,147 | Scott | Sept. 10, 1940 |
| 2,449,766 | Brown | Sept. 21, 1948 |